May 1, 1923.  1,453,872
R. C. HAWKINS ET AL.
GROUSER
Filed May 23, 1922
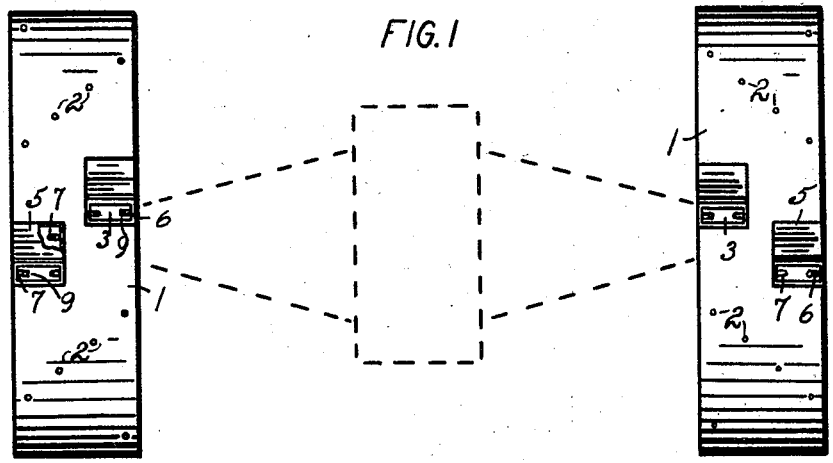
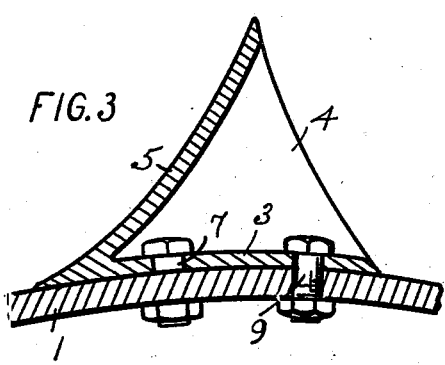
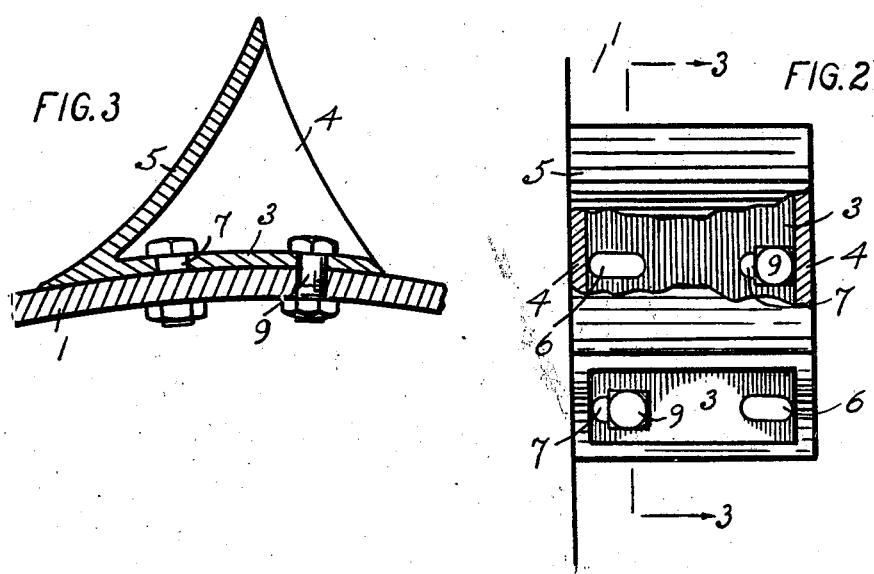
ROE C. HAWKINS
ERNEST S. HIXSON
INVENTORS.
BY R. W. Smith
ATTORNEY.

Patented May 1, 1923.

1,453,872

UNITED STATES PATENT OFFICE.

ROE C. HAWKINS AND ERNEST S. HIXSON, OF LONG BEACH, CALIFORNIA.

GROUSER.

Application filed May 23, 1922. Serial No. 562,974.

*To all whom it may concern:*

Be it known that we, ROE C. HAWKINS and ERNEST S. HIXSON, citizens of the United States, and residents of Long Beach, county of Los Angeles, State of California, have invented new and useful Improvements in Grousers, of which the following is a specification.

This invention relates to grousers adapted for attachment to the wheels of tractors and the like, in order to obtain the desired traction when driving in sand, loose soil, and the like.

It is the object of the invention to provide a construction wherein the front face of the grouser is so arranged as to eliminate the usual sharp corner between the grouser and the periphery of the wheel, thereby avoiding the possibility of soil clogging upon the grouser at the junction of the same with the wheel.

It is a further object of the invention to provide attaching means for the grouser, so arranged and constructed, that usual rivet holes in the periphery of the tractor wheel and normally utilized for mounting a standard diagonal tractor bar upon the wheel, may be employed for mounting the grouser, said attaching means being adapted for the proper positioning of a grouser on either wheel of a tractor, and at either side edge of a wheel.

The invention will be readily understood from the following description of the accompanying drawings, in which:

Fig. 1 is a rear elevation showing the wheels of a tractor with the improved grousers mounted thereon.

Fig. 2 is a plan view of one of the grousers in position upon a wheel and partly broken away.

Fig. 3 is a section on the line 3—3 of Fig. 2.

The improved grousers are adapted to be mounted upon the wheels 1 of a tractor, said wheels being provided with usual diagonal rows of apertures 2 adapted to receive rivets, for attaching usual diagonal tractor bars when the latter are used upon the wheels.

When the improved grousers are used, the usual diagonal tractor bars are removed, and the grousers are interchangeable, and so constructed, that apertures 2 may be used in mounting the grousers in proper position, irrespective of the fact that the rows of apertures upon the two wheels extend in opposite diagonal directions.

As an instance of this arrangement, each grouser comprises a base 3, curved to fit the periphery of the wheel, side plates 4 extending upwardly from said base, and a front contact face 5 connecting the side plates. The contact face 5 is angularly disposed with relation to the radius of the wheel, so that the base of said face is in advance of the outer edge of the same. The contact face is also curved inwardly from its base to its outer edge, as clearly shown in Fig. 3, so as to eliminate sharp corners at the junction of the contact face of the grouser with the periphery of the wheel.

As a consequence it will be seen that there is no space at the base of the grouser where soil may collect, thereby eliminating the possibility of the grousers becoming clogged with dirt.

Four apertures are provided in base 3 and are arranged one in advance of another at the respective sides of the base, said apertures being used in opposite diagonal pairs 6 and 7. The apertures are preferably transversely elongated as shown in Fig. 2.

The apertures are so positioned, that when a grouser is placed upon a wheel, either apertures 6 or 7 will aline with holes 2, depending upon the direction of the diagonal row of holes, and it will thus be seen that the grouser is adaptable to either wheel. The grouser may also be positioned flush with either side edge of a wheel, since the lateral elongation of apertures 6—7 will allow the apertures to aline with holes 2, while still permitting the necessary slight lateral adjustment of the grouser in order to position it exactly at one side edge or the other of the wheel.

The grousers may be fixed in position by bolts 9 received through holes 2 and the pair of apertures in the base of the grouser which is being used.

It will thus be seen that we have provided an improved grouser construction which will not clog with soil, and which is so constructed that it may be readily mounted in position at either side edge of either wheel of a tractor, while still utilizing the usual oppositely diagonal row of rivet holes in the wheels. It will be further noted that the attaching means as thus set forth, positively fixes the grousers in position, and eliminates the possibility of pivotal displacement of a grouser, as is possible when a single attaching bolt is used.

It will be apparent that various changes may be made in the construction as thus described, without departing from the spirit of the invention.

What is claimed is:

The combination with the wheels of a tractor having oppositely diagonal rows of apertures, of grousers having laterally elongated oppositely diagonal pairs of apertures adapted for respective alinement with said diagonal rows of apertures of the respective wheels, the spacing of said wheel apertures from the side edges of the wheels, with relation to the spacing between said wheel apertures and the width of said grousers, being such as to aline said oppositely diagonal pairs of elongated grouser apertures with said wheel apertures at opposite ends of said elongated apertures when said grousers are positioned at the respective side edges of a wheel with the outer sides of said grousers in alinement with the outer edges of said wheel, and fastening means adapted to be received through the alined apertures.

In testimony whereof we have signed our names to this specification.

ROE C. HAWKINS.
ERNEST S. HIXSON.